United States Patent [19]

Robinson et al.

[11] Patent Number: 5,081,182

[45] Date of Patent: Jan. 14, 1992

[54] CATIONIC MONOMER DELAYED ADDITION PROCESS

[75] Inventors: Peter M. Robinson, Columbus; Nguyen Van-Det, Midland, both of Ga.

[73] Assignee: Exxon Chemical Patents Inc., Linden, N.J.

[21] Appl. No.: 488,312

[22] Filed: Mar. 5, 1990

Related U.S. Application Data

[63] Continuation-in-part of Ser. No. 864,365, May 19, 1986, abandoned.

[51] Int. Cl.⁵ .............................................. C08L 41/00
[52] U.S. Cl. .................... 524/814; 524/812; 524/815; 524/829
[58] Field of Search ............... 524/801, 812, 814, 815, 524/829

[56] References Cited

U.S. PATENT DOCUMENTS

| | | | |
|---|---|---|---|
| 3,920,599 | 11/1975 | Hurlock et al. | 524/801 |
| 4,077,930 | 3/1978 | Lim et al. | 524/801 |
| 4,090,992 | 5/1978 | Scanley | 524/801 |
| 4,147,681 | 4/1979 | Lim et al. | 526/305 |
| 4,152,200 | 5/1979 | Coscia et al. | 162/168.3 |
| 4,217,262 | 8/1980 | Coscia et al. | 524/801 |
| 4,299,755 | 11/1981 | Keggenhoff et al. | 524/55 |
| 4,330,450 | 5/1982 | Lipowski et al. | 524/801 |
| 4,696,962 | 9/1987 | Danner et al. | 524/140 |

FOREIGN PATENT DOCUMENTS

| | | | |
|---|---|---|---|
| 0107226 | 5/1984 | European Pat. Off. | 524/812 |
| 3248655 | 7/1984 | Fed. Rep. of Germany | 524/812 |
| 0006393 | 1/1978 | Japan | 524/812 |
| 1261302 | 11/1986 | Japan | 524/812 |

*Primary Examiner*—Joseph L. Schofer
*Assistant Examiner*—J. M. Reddick

[57] ABSTRACT

Water-in-oil emulsions of cationic water-soluble copolymers which are prepared by incorporating only a portion of the cationic monomer in the aqueous phase prior to forming the water-in-oil emulsion in which polymerization will occur, forming the emulsion, adding the balance of the cationic monomer such that essentially no polymerization occurs immediately after the addition, and polymerizing the monomers. Copolymers prepared by this process show improved performance over conventionally prepared cationic copolymers.

21 Claims, No Drawings

CATIONIC MONOMER DELAYED ADDITION PROCESS

CROSS-REFERENCE TO RELATED APPLICATION

This application is a continuation-in-part of U.S. Ser. No. 864,365, filed May 19, 1986, now abandoned.

BACKGROUND OF THE INVENTION

This invention relates generally to water-soluble cationic copolymers dispersed in water-in-oil emulsions and an improved process for preparing such copolymers. More particularly, the present invention relates to cationic water-soluble polymers which are prepared by a delayed addition process as specified herein and which, due to the method of preparation, exhibit improved performance characteristics.

Water-in-oil emulsions containing cationic water-soluble copolymers dispersed therein are well-known in the art. Such emulsions have found a wide variety of uses, for example, as flocculants in the mining and paper industries and in sewage treatment, and as mobility control agents in enhanced oil recovery. These emulsions have generally been made by dissolving the entire monomer charge in the water and then preparing the water-in-oil emulsion which is the medium in which the polymerization is conducted. This conventional preparation process has been found to generally limit the performance characteristics of the resulting copolymers.

One attempt to overcome this problem with cationic copolymers is disclosed in U.S. Pat. No. 4,152,200 of A. T. Coscia et al. wherein a portion of the cationic comonomer is withheld from the initial emulsion and then, after polymerization has been initiated, is added incrementally throughout a major portion of the polymerization reaction. The intent of Coscia et al. appears to be to balance the reactivity ratios of the monomer mixture to take into account the differences in reactivity of the cationic monomer versus the non-ionic comonomer. However, the cationic copolymers produced by Coscia et al., although usually superior in performance to conventionally prepared polymers, still have insufficient performance characteristics for many uses of cationic copolymers, particularly as retention aids for paper or as flocculant for municipal sewage sludge.

It is accordingly an object of the present invention to produce water-in-oil emulsions of finely dispersed water-soluble copolymer particles in which the emulsions have improved performance characteristics. It is a further object to develop an improved process for preparing cationic copolymers whereby the surfactant and/or oil contents may be reduced below those amounts conventionally used. It is a further object to develop an improved paper retention aid. It is a further object to develop an improved flocculants for sludge dewatering. These and other objects will become apparent from the ensuing detailed description.

DESCRIPTION OF THE INVENTION

In accordance with the present invention, there is provided an improved process of preparing water-in-oil emulsions of water-soluble cationic copolymers which comprises (i) preparing an aqueous solution of a water-soluble non-ionic monomer and from about 15 to about 85 weight percent of the total quantity of a cationic monomer to be incorporated, (ii) emulsifying the aqueous solution in a sufficient quantity of a hydrocarbon oil to form a water-in-oil emulsion, (iii) adding the balance of the cationic monomer to the water-in-oil emulsion in the substantial absence of polymerization either during or immediately after the addition, and (iv) polymerizing the monomers to form a cationic water-in-oil emulsion copolymer. The copolymers so produced differ from copolymers prepared by other processes in that they exhibit improved performance characteristics.

The cationic copolymers of the present invention are comprised of (a) at least 30 mole percent of repeating units derived from water-soluble nonionic monomers and (b) repeating units derived from cationic monomers. Nonionic water-soluble monomers useful herein include acrylamide, methacrylamide, N-methylacrylamide, N-methylmethacrylamide, diacetone acrylamide, and the like Suitable cationic monomers include the methosulfate or methylchloride quaternaries of such as dimethylaminoethyl acrylate, dimethylaminoethyl methacrylate, diethylaminoethyl acrylate, and diethylaminoethyl methacrylate, as well as 3-(methylacrylamido)propyltrimethylammonium chloride, diallyldimethylammonium chloride, 1-trimethylammonium-2-hydroxypropyl methacrylate methosulfate, and the like.

Other comonomers may also be used in minor amounts in the copolymers. They may be water-soluble or water-insoluble, provided that the final copolymer is still water-soluble, i.e. it is soluble in water in an amount of at least 1% by weight. If the other comonomers are anionic, the mole proportion thereof should be less than or equal to that of the cationic comonomer so that the resulting polymer ionicity is neutral or cationic. The other monomers may be anionic, neutral, or amphoteric. Examples of these other monomers include acrylic acid and its salts, methacrylic acid and its salts, vinyl acetate, methyl acrylate, ethyl acrylate, beta-carboxyethyl acrylate, propyl acrylate, methyl methacrylate, ethyl methacrylate, maleic acid and its salts, hydroxyethyl acrylate, hydroxyethyl methacrylate, styrene, acrylonitrile, 2-acrylamido-2-methylpropane sulfonic or phosphonic acid and their salts, dimethylaminopropylmethacrylamide, isopropylaminopropyl methacrylamide, methacrylamidopropylhydroxyethyldimethylammonium acetate, vinyl methyl ether, vinyl ethyl ether, vinyl sulfonic acid and its salts, vinyl pyridine, vinyl pyrrolidone, vinyl imidazole, styrene sulfonic acid and its salts, and the like.

The copolymers produced herein comprise at least about 30 mole % water-soluble nonionic monomer units, about 1 to 70 mole cationic monomer units, and the balance, if any, of other copolymerizable monomers such that the copolymer is water-soluble and cationic. Preferably, the copolymer contains at least about 50 mole % water-soluble nonionic monomer units and, most preferably, those units are derived from acrylamide.

Although the present invention has been found to be independent of the particular emulsion polymerization method employed provided that a portion, i.e. about 15 to 85 weight %, of the cationic monomer is added after the emulsion is formed and in the substantial absence of polymerization either during the addition or immediately thereafter, certain preferences are delineated in the general description of the emulsion preparation which follows in which all percents are by weight unless otherwise specified:

A preliminary emulsion is made by homogenizing oil and aqueous phases The oil phase of the emulsion, which generally comprises from about 5 to 35% of the total emulsion, is comprised of one or more inert hydrophobic liquids. Preferably, the oil phase comprises about 15 to 30% of the emulsion. The oil used may be selected from a large class of organic liquids which are immiscible with water, including liquid hydrocarbons and substituted liquid hydrocarbons. Representative examples of such oils include benzene, xylene, toluene, mineral oils, kerosenes, napthas, chlorinated hydrocarbons, such as perchloroethylene, and the like.

The oil phase also contains the primary surfactants, i.e. conventional emulsion polymerization stabilizers. Such stabilizers are well known to the art to promote the formation and stabilization of water-in-oil emulsions. Normally such emulsifiers have HLB values in the range of about 2 to about 10, preferably less than about 7. Suitable such emulsifiers include sorbitan esters, phthalic esters, fatty acid glycerides, glycerine esters, as well as ethoxylated versions of the above and any other well known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions thereof containing 1 to 10 moles of ethylene oxide per mole of the basic emulsifier. Thus any emulsifier may be utilized which will permit the formation of the initial emulsion and stabilize the emulsion during the polymerization.

The primary surfactants are used alone or in mixtures and are utilized in as low amounts as is possible since an excess will not only increase the cost of the resultant emulsion but may also reduce the performance. As such, all of the primary surfactants should together be used in amounts not greater than about 5% of the total emulsion. Preferably the amount is not greater than 3%, and most preferably less than about 2.5%.

The aqueous phase generally comprises about 95 to 65%, preferably about 85 to 70%, of the emulsion. In addition to water, it contains the monomers being polymerized, except for the portion (about 15 to 85%, preferably about 20 to 80%, and most preferably about 45 to 70%) of the cationic monomer which is withheld. Generally the water will be present in an amount of less than about 45%, preferably about 20 to about 40%, and most preferably about 25 to about 35%, of the total emulsion. It will usually contain the conventional chain transfer agents, initiators and sequestrants, all in conventional amounts, alternatively, they may be added to the system after the preliminary emulsion has been prepared. The initiator may also be added continuously during the polymerization to better control the rate of polymerization, depending upon the particular monomers used and their reactivities. All of these variations are well known in the art.

Any conventional chain transfer agent, such as propylene glycol, isopropanol, 2-mercaptoethanol, sodium hypophosphite, dodecyl mercaptan, or thioglycolic acid, may be employed. The chain transfer agent is generally present in an amount of about 0.1 to 10 percent by weight of the total emulsion, though more may be used if desired for a particular product.

The initiator may be any free radical producing material well known in the art. The preferred free radical producers are the redox-type and the azo-type polymerization initiators. They may be used either individually or in combinations and generally in an amount of about 0.0005 to 0.5% by weight of the total emulsion. Radiation may be used to initiate the reaction.

Any conventional sequestrant may also be present in the aqueous phase. Examples include such as ethylenediaminetetraacetic acid or pentasodium diethylenetriamine pentaacetate. The sequestrant is generally present in an amount of about 0.01 to 2% of the total emulsion, though more may be utilized.

Following preparation of the preliminary emulsion, the balance of the cationic monomer is added, generally rapidly and with stirring, in the substantial absence of polymerization either during the addition or immediately thereafter or both. The specific addition rate has not been found to be critical, but it must not be so fast as to destabilize the preliminary emulsion nor so slow as to permit autocatalysis. The preliminary emulsion may be at room temperature or, more preferably, near or at the desired polymerization temperature when the delayed addition is made. The preliminary emulsion may be raised to the polymerization temperature by an external heating mechanism, though more preferably, it is done by initiating polymerization of the monomers in the preliminary emulsion and allowing the exothermic reaction to increase the temperature to the desired level. If polymerization is used to raise the temperature, less than about 10%, preferably less than about 5%, of the total monomer charge is polymerized before the delayed addition of the balance of the cationic monomer is made.

If the addition is made at room temperature or after heating by an external mechanism, essentially no polymerization will have occurred before the addition and the rate of polymerization immediately after the addition is essentially zero. If polymerization is used to raise the temperature, as is preferred for commercial use of the process, the polymerization may be either deliberately suspended or quenched or, more preferably, the addition of the balance of the cationic monomer may be used to effectively quench the reaction. In all cases, the addition is made in the substantial absence of polymerization, either during the addition or immediately thereafter, or both, i.e. the polymerization rate is essentially zero. The intentional quenching may be accomplished by such as eliminating the sustaining catalyst feed or deliberately adding oxygen to the reaction or both.

When no specific quenching of the polymerization is performed, the addition of the cationic monomer can serve to effectively quench the polymerization for a period of about 10 to 40 minutes by having the cationic monomer air saturated. To insure saturation, the monomer can be pressure transferred to the reactor using an air pad. The ingress of oxygen at the start of the cationic monomer addition effectively quenches the reaction and immediately stops polymerization due to oxygen radical scavenging. Polymerization is then re-started by applying a nitrogen purge to the reactor and addition of catalyst. It takes about 15 to 45 minutes for sustained polymerization to occur.

In all of the cases discussed above, the rate of polymerization is effectively zero immediately after the remaining cationic monomer is added.

The polymerization is then initiated or re-initiated and continued until the desired high molecular weight polymer is produced.

The cationic monomer may be added neat, though generally it will be dissolved in water or even in the aqueous phase of a secondary water-in-oil latex. When a secondary latex is used, the total amount of oil and primary surfactants have been found to be reduced from that which would conventionally be used. The cationic monomer may be treated to remove the polymerization inhibiting oxygen, but this has not been found necessary.

The polymerization is generally operated at a temperature of about $-20°$ to $200°$ C., preferably at about $0°$ to $100°$ C., and most preferably at about $35°$ to $75°$ C.

Preferably, the polymerization is run at a pH of about 2 to 12 and a suitable amount of base or acid is added to the preliminary emulsion to achieve the desired pH. The polymerization is usually completed in about an hour or two to several days, depending upon the monomers employed and other reaction variables. It is generally performed at atmospheric pressure, but higher pressures are advantageously used when volatile ingredients are involved.

Following completion of the polymerization, the pH of the emulsion may be adjusted as desired. For cationic polymer emulsions this is generally about 2.0 to 7.0 and for neutral emulsions about 2.0 to 8.0. A breaker surfactant is generally added to yield a self-inverting final product. Any suitable breaker surfactant may be employed, routine experimentation being the best means to determine which breaker surfactant will perform optimally for each emulsion system. Typical breaker surfactants include those having relatively high HLB numbers such as ethoxylated octyl and nonyl phenols, ethoxylated nonyl phenol formaldehyde resin, polyethylene oxide esters of fatty acids, dioctyl esters of sodium sulfosuccinate and others disclosed in U.S. Pat. No. 3,624,019 incorporated herein by reference. Typically, the breaker surfactant is used in an amount equal to about 0.5 to 5% by weight, preferably below about 3%, and most preferably below about 2.5%, based on the total emulsion.

Once prepared, the emulsions of the present invention may be chemically modified in any known manner. "Chemically modified" is used herein to further treatments of the dispersed water-soluble polymer and/or the addition of components to the dispersed water-soluble polymer which, without the stabilization provided by the emulsion stabilizers, would cause the normally water-soluble polymeric particles to coagulate or agglomerate. Examples of such further treatments are disclosed, for example, in U.S. Pat. Nos. 4,052,353 and 4,171,296, incorporated herein by reference. The emulsion of the present invention may also be concentrated in any suitable manner, such as is disclosed in U.S. Pat. No. 4,021,399, incorporated herein by reference.

When the cationic copolymer emulsions of the present invention are used as retention aids for paper, they are added to the paper furnish at the wet end of the paper machine in typical amounts such as about 0.1 to about 15.0 pounds of active polymer per ton of finished paper. When they are used for flocculation in sludge dewatering, they are again used in conventional amounts, e.g. about 1 to about 500 ppm on a sludge containing about 1 to 5% of suspended material.

The following examples are illustrative of the present invention, but are not in any way a limitation thereof.

All percents and parts are by weight unless otherwise specified.

COMPARATIVE EXAMPLE A

A water phase containing 260 g. of acrylamide, 90 g of dimethylaminoethyl methacrylate methyl chloride quaternary 1.2 g of ethylenediaminetetraacetic acid, 0.5 g of potassium bromate, and 331.6 g of water is homogenized with an oil phase containing 220 g of oil, 14.5 g of ricinoleic acid triglyceride ester which has been hydrogenated and ethoxylated with five moles of ethylene oxide, and 4.8 g of sorbitan monooleate. The resulting emulsion system is then transferred to a suitable reaction vessel with stirring and sparged with nitrogen. 30.0 g of a 4.5% solution of sodium bisulfite is added continuously during the polymerization and the temperature of the emulsion increases to about $35°-45°$ C. Cooling is used to maintain this temperature and agitation is maintained for 4–10 hours. The polymerization is completed at the end of that time and an 8 mole % cationic polyacrylamide emulsion with 35% polymer solids results.

EXAMPLE I

The procedure of Comparative Example A was repeated except that 56.3 g of the cationic monomer dimethylaminoethylmethacrylate methyl chloride quaternary was omitted in preparing the initial water-in-oil emulsion. The initial emulsion was then heated to $40°$ C. via external heating and the omitted cationic monomer was added in the form of an 80% solution within about 30 minutes, i.e. about 5 minutes. Thereafter, polymerization proceeded with the commencement of the bisulfite addition as in Comparative Example A.

COMPARATIVE EXAMPLE B

The procedure of Example I was repeated except that the omitted cationic monomer was added after the polymerization had been commenced and the temperature had increased to $40°$ C. It was added continuously during the polymerization as described in U.S. Pat. No. 4,152,200.

EXAMPLE II

In order to determine the performance characteristics of the cationic copolymers prepared in each of Comparative Examples A and B and Example I, the emulsions are evaluated as retention aids on paper mill furnish. The testing was performed using a conventional Britt Jar procedure. The average results of several replications are given in Table I below:

TABLE I

| Polymer of Example | Retention Aid Evaluation | | |
|---|---|---|---|
| | Dosage, #/ton active | % First Pass Retention Ash | % First Pass Retention Total |
| Comparative A | 1.0 | 24 | 60 |
| Comparative B | 1.0 | 32 | 60 |
| I | 1.0 | 37 | 67 |
| Comparative A | 1.5 | 35 | 62.5 |
| Comparative B | 1.5 | 41.5 | 64 |
| I | 1.5 | 47 | 72 |
| Comparative A | 2.0 | 38.5 | 65 |
| Comparative B | 2.0 | 48 | 66.5 |
| I | 2.0 | 52 | 74.5 |

As can be seen, in each case the polymer of the present invention clearly outperformed the polymers prepared by prior art methods.

EXAMPLE III

The procedure of Example I to produce an emulsion was repeated except that the cationic monomer was changed to dimethylaminoethyl methacrylate methosulfate quaternary, which is generally known to produce a less effective retention aid. However, unexpectedly, when the Britt Jar evaluation of Example II was conducted with this copolymer the results were even superior to those observed with the copolymer of Example I, as can be seen in Table II below:

TABLE II

| | Results of Example III | |
|---|---|---|
| Dosage #/ton active | % First Pass Retention of Ash | % First Pass Retention Total |
| 1.0 | 40 | 68 |
| 1.5 | 50.5 | 74 |
| 2.0 | 57 | 78 |

EXAMPLE IV

The procedure of Example I was repeated except that instead of using external heating to increase the temperature to 40° C. before adding the omitted cationic monomer, polymerization of the emulsion was commenced by the addition of sodium bisulfite. When the temperature reached 40° C. (after less than 5% monomer conversion) the bisulfite addition was stopped and the reaction was terminated by oxygen quenching, i.e. essentially no polymerization was occurring. At this point, the omitted cationic monomer was added within about 5 minutes. After the addition was complete, the reactor was purged with nitrogen, the bisulfite feed was restarted and polymerization continued until the reaction was complete. When tested as a retention aid as in Example II, substantially equivalent results to those of Example I were observed.

COMPARATIVE EXAMPLE C

The procedure of Example IV was repeated except that all of the cationic monomer was placed in the initial emulsion and none was added during the 5 minutes the reaction was stopped. When tested as a retention aid as in Example II, substantially equivalent results to those of Comparative Example A occurred.

EXAMPLE V

The procedure of Example I was repeated except that 30% of the water-in-oil emulsion forming ingredients, i.e. water, oil, ricinoleic acid ester and sorbitan monooleate, was omitted from primary water-in-oil emulsion and the omitted cationic monomer was added in the water phase of a water-in-oil emulsion which contained the omitted thirty percent of the emulsion forming ingredients. When tested as a retention aid as in Example II, substantially equivalent results to those of Example I occurred.

EXAMPLE VI

The procedures of Comparative Example A and then Example I was repeated except that (i) the cationic monomer was replaced with dimethylaminoethyl methacrylate methosulfate quaternary and the amount was increased to 20 mole percent, (ii) sorbitan monooleate was used as the sole surfactant, and (iii) the catalyst was 2,2'-azobis(isobutyronitrile) added incrementally during the polymerizations.

To evaluate the sludge dewatering performance characteristics of the resultant polymers, a series of conventional Buchner Funnel tests were performed on sludge from the Detroit sewage treatment plant. The tests were performed by taking a representative sludge sample, dividing it into aliquots, adding the desired amount of polymer being tested, conditioning the sludge by mixing the polymer in the sludge for 15 seconds at 450 rpm, pouring the conditioned sludge into the Buchner Funnel having moist filter paper, and determining the drainage for a given period of time. The results of the tests are shown in Table III below.

TABLE III

| | Sludge Dewatering Evaluation Drainage in Milliliters | |
|---|---|---|
| | Polymer | |
| Dosage #/ton | Comparative | Invention |
| 20 | 49–95 | 113–117 |

EXAMPLE VII

The procedure of Example IV was repeated to produce various cationic polymers, except that the oxygen quenching was omitted and the addition of the large mass of the balance of the cationic monomer was used to quench the polymerization during the addition and thereafter, i.e. the rate of polymerization was reduced to essentially zero until about 20 minutes after the addition had been completed. The bisulfite addition was recommenced and the polymerization was re-initiated.

A comparison of the polymer of this Example with that of Example IV showed no difference in performance as a retention aid in the Britt Jar procedure of Example II.

EXAMPLE VIII

The procedures of Example I ("delayed addition" with 62% cationic monomer withheld initially) and Comparative Examples A ("standard") and B ("continuous addition") were repeated for a series of different cationic polymers. The copolymers prepared were: (a) acrylamide and dimethylaminoethyl methacrylate-methosulfate quaternary (DMAEMA-MS) containing 8, 20, and 50 mole % of the quaternary; (b) acrylamide and methacrylamidopropyltrimethylammonium chloride (MAPTAC) containing 24 and 43 mole % MAPTAC; and (c) acrylamide and dimethylaminoethyl methacrylatemethylchloride quaternary (DMAEMA-MCl) containing 8 mole % of the quaternary.

The 8 mole % DMAEMA-MCl copolymers were evaluated as retention aids on paper mill furnish by performing conventional Britt Jar tests. The copolymer prepared by the "delayed addition" process of the present invention showed a greater improvement over the "continuous addition" process than the "continuous addition" process showed over the "standard" copolymer in both first pass retention (total) and (ash).

The 8 mole % DMAEMA-MS copolymers were evaluated as above as retention aids and the "delayed addition" copolymers showed an even greater improvement over the "continuous addition" copolymers than for the DMAEMA-MCl comparison.

The 50 mole % DMAEMA-MS copolymers were evaluated for sludge dewatering on sludge from the City of Memphis Waste Water Treatment Plant by performing Buchner Funnel tests as in Example VI. The "delayed addition" copolymer showed as great an improvement in performance over the "continuous addition" copolymer as the "continuous addition" copolymer showed over the "standard" copolymer.

The 20 mole % DMAEMA-MS copolymers, the 24 mole % MAPTAC copolymers, and the 43 mole % MAPTAC copolymers were evaluated in sludge dewatering as above. In each case, the "delayed addition" copolymer showed as great an improvement in performance over the "continuous addition" copolymer as the "continuous addition" copolymer showed over the "standard" copolymer.

EXAMPLE IX

The procedures of Example VII ("delayed addition" using heat of polymerization to raise temperature and addition of balance of cationic monomer to quench reaction), Comparative Example B ("continuous addition"), and Comparative Example A ("standard") were repeated to produce copolymers of acrylamide and various cationic monomers. The comparisons were made at low, medium, and high cationic charge polymers and at amounts of cationic monomer withheld at 20, 35, and 80%. The specific copolymers produced and withheld amounts were:

(a) MAPTAC: 2.5 mole % at standard, 20, and 80% withhold;
(b) DMAEMA: 20 mole % at standard, 35, and 80% withhold; and
(c) DMAEMA: 50 mole % at standard, 20, and 80% withhold. MAPTAC is 3-methylacrylamido-propyl-trimethylammonium chloride and DMAEMA is dimethylaminoethyl methacrylate methosulfate quaternary.

In each of the evaluations, the "standard" and "continuous addition" controls were made and evaluated side-by-side against the "delayed addition" copolymers of this invention. The "delayed addition" copolymers were each produced as follows: polymerization was commenced in the absence of the withheld cationic monomer and the heat of polymerization was used to increase the reaction temperature from room temperature to 40° C.; the withheld cationic monomer which was air-saturated was added, quenching the reaction due to the oxygen radical scavenging that occurred—the polymerization stopped instantaneously; and polymerization was restarted by a nitrogen purge followed by catalyst addition. A persistent exotherm was usually detected within 10 to 20 minutes of the catalyst addition in each of the polymerizations.

The resultant copolymers were each evaluated as dewatering aids by conventional drainage tests as described in the previous examples. The 2.5 mole % MAPTAC copolymers were evaluated on paper mill waste using a mixture of primary and secondary sludge. The DMAEMA copolymers were evaluated on various municipal sludges. In each comparison, the copolymers prepared by the "delayed addition" process substantially outperformed those prepared by either the "continuous addition" process or the "standard" copolymers.

What is claimed is:

1. A water-soluble cationic copolymer in the aqueous phase of a water-in-oil emulsion wherein the copolymer comprises (a) at least 30 mole % of repeating units derived from a water-soluble nonionic monomer and (b) repeating units derived from a cationic monomer, wherein the copolymer is prepared by (i) preparing an aqueous solution of the nonionic monomer and about 15 to about 85 weight percent of the cationic monomer, (ii) emulsifying the aqueous solution in a sufficient quantity of hydrocarbon oil to form a water-in-oil emulsion, (iii) adding the balance of the cationic monomer to the emulsion in the substantial absence of polymerization during the addition, and (iv) polymerizing the monomers.

2. The copolymer of claim 1 wherein prior to adding the balance of the cationic monomer the temperature of the emulsion is increased to about the polymerization temperature.

3. The copolymer of claim 2 wherein the temperature is increased by external heating.

4. The copolymer of claim 2 wherein the temperature is increased by initiating polymerization of the monomers and then suspending the polymerization during the addition of the balance of the cationic monomer.

5. The copolymer of claim 1 wherein the nonionic monomer is selected from the group consisting essentially of acrylamide, methacrylamide, N-methylacrylamide, diacetoneacrylamide, and N-methylmethacrylamide.

6. The copolymer of claim 1 wherein the cationic monomer provides about 1 to 70 mole % of the repeating units and is selected from the group consisting essentially of 3-methylacrylamido-propyltrimethylammonium chloride and the methosulfate and methylchloride quaternaries of dimethylaminoethyl acrylate, dimethylaminoethyl methacrylate, diethylaminoethyl acrylate, and diethylaminoethyl methacrylate.

7. The copolymer of claim 1 further containing minor amounts of repeating units derived from monomers selected from the group consisting essentially of anionic monomers and nonionic water-insoluble monomers.

8. The copolymer of claim 1 wherein the balance of the cationic monomer is added as an aqueous solution.

9. The copolymer of claim 1 wherein the balance of the cationic monomer is added as an emulsion in the aqueous phase of a water-in-oil emulsion.

10. The copolymer of claim 1 wherein the balance of the cationic monomer is about 30 to 75 weight % of the total cationic monomer being polymerized.

11. A method of preparing a water-soluble cationic copolymer, which is composed of (a) at least 30 mole % of repeating units derived from a water-soluble nonionic monomer and (b) repeating units derived from a cationic monomer, which comprises the steps of (i) preparing an aqueous solution of the nonionic monomer and about 15 to 85 weight % of the cationic monomer, (ii) emulsifying the aqueous solution in a sufficient quantity of hydrocarbon oil to form a water-in-oil emulsion, (iii) adding the balance of the cationic monomer to the emulsion in the substantial absence of polymerization, and (iv) polymerizing the monomers.

12. The method of claim 11 wherein prior to adding the balance of the cationic monomer the temperature of the emulsion is increased to about the polymerization temperature.

13. The method of claim 12 wherein the temperature is increased by external heating.

14. The method of claim 12 wherein the temperature is increased by initiating polymerization of the monomers and then suspending the polymerization during the addition of the balance of the cationic monomer.

15. The method of claim 14 wherein the suspending of polymerization is caused by the addition of the balance of the cationic monomer.

16. The method of claim 11 wherein the nonionic monomer is selected from the group consisting essentially of acrylamide, methacrylamide, N-methylacrylamide, diacetoneacrylamide, ad N-methylmethacrylamide.

17. The method of claim 11 wherein the cationic monomer provides about 1 to 70 mole % of the repeating units and is selected from the group consisting essentially of 3-methylacrylamido-propyltrimethylammonium chloride and the methosulfate and methylchloride quaternaries of dimethylaminoethyl acrylate, dimethylaminoethyl methacrylate, diethylaminoethyl acrylate and diethylaminoethyl methacrylate.

18. The method of claim 11 further containing minor amounts of repeating units derived from monomers selected from the group consisting essentially of anionic monomers and non-ionic water-insoluble monomers.

19. The method of claim 11 wherein the balance of the cationic monomer is added as an aqueous solution.

20. The method of claim 11 wherein the balance of the cationic monomer is added as a latex in the aqueous phase of a water-in-oil emulsion.

21. The method of claim 11 wherein the balance of the cationic monomer is about 30 to 75 weight % of the total cationic monomer being polymerized.

* * * * *